United States Patent [19]
Farooque et al.

[11] Patent Number: 5,580,673
[45] Date of Patent: Dec. 3, 1996

[54] CARBONATE FUEL CELL MATRIX

[75] Inventors: Mohammad Farooque, Huntington; Chao-Yi Yuh, New Milford, both of Conn.

[73] Assignee: Energy Research Corporation, Danbury, Conn.

[21] Appl. No.: 319,269

[22] Filed: Oct. 6, 1994

Related U.S. Application Data

[63] Continuation-in-part of Ser. No. 5,649, Jan. 19, 1993, abandoned.

[51] Int. Cl.$^6$ .................................................. H01M 8/10
[52] U.S. Cl. .................. 429/41; 429/44; 429/46; 429/247; 29/623.5; 423/600
[58] Field of Search ................... 429/41, 46, 44, 429/247, 30; 29/623.5; 423/600

[56] References Cited

U.S. PATENT DOCUMENTS

| | | | |
|---|---|---|---|
| 3,432,363 | 3/1969 | Gillis | 136/153 |
| 4,130,402 | 12/1978 | Schepers et al. | 51/309 |
| 4,308,088 | 12/1981 | Cherdron et al. | 156/603 |
| 4,322,482 | 3/1982 | Bushnell et al. | 429/41 |
| 4,329,403 | 5/1982 | Baker | 429/35 |
| 4,404,267 | 9/1983 | Iacovangelo et al. | 429/41 |
| 4,478,776 | 10/1984 | Maricle et al. | 264/83 |
| 4,710,436 | 12/1987 | Nakamura et al. | 429/41 |
| 4,851,377 | 2/1989 | Breault | 502/101 |

FOREIGN PATENT DOCUMENTS

| | | |
|---|---|---|
| 0121301 | 2/1984 | European Pat. Off. |
| 3235240 | 6/1982 | Germany |

*Primary Examiner*—Maria Nuzzolillo
*Attorney, Agent, or Firm*—Robin, Blecker, Daley & Driscoll

[57] ABSTRACT

A carbonate fuel cell matrix comprising support particles and crack attenuator particles which are made platelet in shape to increase the resistance of the matrix to through cracking. Also disclosed is a matrix having porous crack attenuator particles and a matrix whose crack attenuator particles have a thermal coefficient of expansion which is significantly different from that of the support particles, and a method of making platelet-shaped crack attenuator particles.

45 Claims, 6 Drawing Sheets

CARBONATE FUEL CELL MATRIX

This invention was made with Government support under Contract Nos. DE-AC21-90MC27168 and DE-FG05-93ER81512 awarded by the Department of Energy. The Government has certain rights in this invention.

RELATED APPLICATIONS

This application is a continuation-in-part of application Ser. No. 08/005,649, filed Jan. 19, 1993, now abandoned.

BACKGROUND OF THE INVENTION

This invention relates to carbonate fuel cells and, in particular, to a matrix for carrying the electrolyte in such fuel cells.

Carbonate fuel cells typically comprise anode sections and cathode sections separated by a carbonate electrolyte. The carbonate electrolyte is normally held within a carrier or matrix sandwiched between the electrodes.

The matrix and supported carbonate electrolyte are sometimes referred to as a tile and together perform a number of functions. One function is to maintain electronic separation or isolation between the anode and cathode sections. A second function is to provide ionic conduction between the sections. A final function is to maintain a separation between the different gases delivered to the sections.

A typical carbonate matrix comprises a porous ceramic member whose pores are filled with the carbonate electrolyte. In such a matrix, the ceramic nature of the material provides the desired electronic isolation. The carbonate electrolyte in the ceramic pores supports the ionic conduction, while the capillary forces holding the liquid carbonate electrolyte within these pores exerts a so-called "bubble pressure" sufficient to prevent mixing of the anode and cathode compartment gases.

Generally, the matrix pores are desired to be in the submicron range (i.e., below about one micron) to achieve a desired gas differential capability of about one psi. Also, large size pores and through cracks (i.e., cracks through the thickness of the matrix) have to be avoided to maintain the desired gas separation. This necessitates that the matrix be strong enough to withstand tensile as well as bending stresses which contribute to or promote the formation of cracks and which are attributable to various factors.

One factor is the thermal expansion of the matrix as a result of thermal cycling of the cell to and from its operating temperature (typically, about 650° C. or above). This cycling results in a phase change in the electrolyte from solid to liquid or liquid to solid with an attendant change in volume which can be about ten percent (10%). Also, during thermal cycling, the fuel cell itself undergoes thermal gradients. Both these factors promote bending and tensile stresses in the matrix.

Initial attempts at designing a matrix having the desired electronic, ionic and gas separation properties involved the use of the above-mentioned ceramic materials for constructing the matrix. U.S. Pat. No. 3,342,363 discloses one such attempt in which ceramic oxides (magnesium and alumina) were used. However, these types of oxides were found to react with the carbonate electrolyte. As a result, more stable oxides, for example, $\gamma LiAlO_2$ were then employed.

While a matrix using submicron particles of these more stable oxides has provided the desired bubble pressure, the matrix has lacked sufficient strength to prevent through cracks. Attempts at increasing the matrix strength have involved the incorporation into the matrix of larger, non-porous particles having roughly boulder-like shapes. These particles, typically referred to as "crack attenuator" particles, are distributed amongst the submicron particles, typically referred to as "support particles" and tend to create micro-cracks, rather than through cracks, in the matrix during cool down. These micro-cracks then heal upon reheating the matrix.

A matrix using such crack attenuator particles and a method of fabricating the matrix are disclosed in U.S Pat. Nos. 4,322,482 and 4,478,776, respectively. These patents describe the use of alumina and lithium aluminate as the crack attenuator particles in sizes varying from 25 microns to 300 microns. Another reference which describes various materials, i.e., $B_4C$, $Mo_2B_5$, BN and HfN, as crack attenuator materials in a ceramic matrix is Japanese Patent Publication 60,241,656.

While a matrix formed with non-porous, boulder-shaped crack attenuator particles has improved the ability of the matrix to resist through cracks, additional improvements are still necessary if the matrix is to withstand the stresses expected in commercial usage. Thus, ways of improving matrix strength to further prevent through cracks are still being sought.

Additionally, a matrix in a carbonate fuel cell adds the majority (approximately two thirds) of the internal ionic resistance to the cell. Reducing the matrix ionic resistance will thus enhance cell performance. Accordingly, ways of designing a matrix to obtain less ionic resistance are also being sought.

It is, therefore, an object of the present invention to provide an improved matrix for a carbonate fuel cell.

It is a further object of the present invention to provide a carbonate fuel cell matrix which has improved resistance to through cracking.

It is yet a further object of the present invention to provide a carbonate fuel cell matrix which has a lower ionic resistance.

SUMMARY OF THE INVENTION

In accordance with the principles of the present invention, the above and other objects are realized, in part, in a carbonate fuel cell matrix in which the matrix comprises a support material formed from support particles of a first size and through which are distributed crack attenuator particles of a second larger size and having a predetermined shape or configuration adapted to increase the resistance of the matrix to through cracking. Specifically, in accordance with the invention, the crack attenuator particles are configured to be diskette or platelet shaped.

The platelet-shaped crack attenuator particles of the invention are arranged so that the thickness of the particles is generally aligned with the thickness of the matrix, thereby aligning the plane of the platelets with that of the matrix. Moreover, the platelets are preferably sized to have a mean diameter in a range of about 20 to 100 microns and an aspect ratio (i.e., ratio of mean diameter to thickness) in a range of about 4 to 20.

In a further aspect of the invention, the platelet-shaped crack attenuator particles are further adapted to have a significantly different thermal coefficient of expansion than the support particles for further promoting resistance to through cracking. A material which can provide such a significantly different thermal coefficient of expansion is $Si_3N_4$.

In yet a further aspect of the invention, the crack attenuator particles utilized to form a matrix are adapted to themselves be porous to promote lower ionic resistance of the matrix. Conventional boulder-shaped crack attenuator particles which are made porous can be used with submicron support particles to obtain a matrix with the desired lower ionic resistance. Additionally, porous, boulder-shaped crack attenuator particles can be used with the platelet-shaped crack attenuator particles of the invention and the submicron support particles to realize a composite matrix having both increased resistance to cracking and lower internal resistance.

In still a further aspect of the invention, a method for making platelet-shaped crack attenuator particles is also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
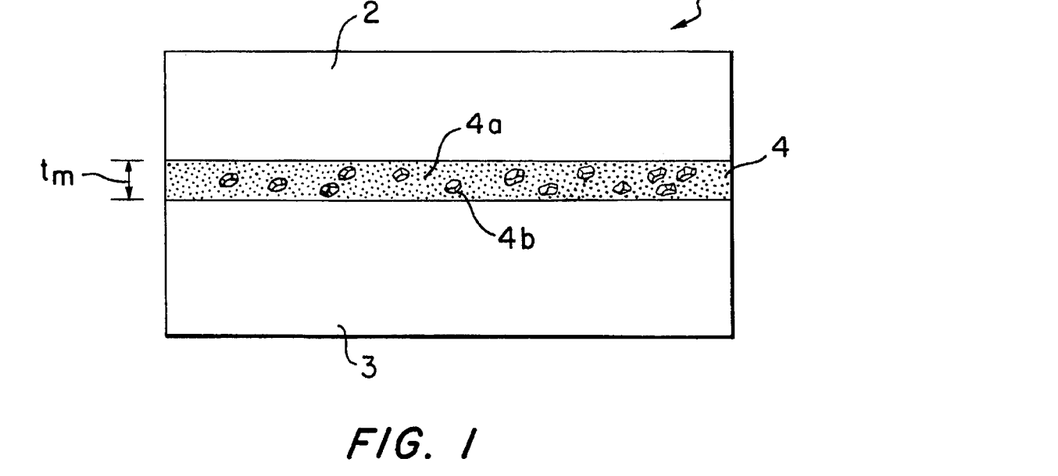
FIG. 1 shows a carbonate fuel cell in accordance with principles of the present invention.

FIG. 1 shows a carbonate fuel cell 1 comprised of an anode section 2 and a cathode section 3. Separating the anode and cathode sections 2 and 3 is a matrix or tile 4 which is adapted to carry or hold the carbonate electrolyte of the cell 1.

The matrix 4 is formed from a support material comprised of submicron support particles 4a and from larger size crack attenuator particles 4b distributed within the submicron particles. The submicron particles are comprised of a material which is stable in the carbonate electrolyte environment. Ceramic materials are usable and a preferable ceramic material is $\gamma$-LiAlO$_2$.

In accordance with the invention, the matrix 4 is configured so as to be more resistance to cracks through the matrix thickness $t_m$ by preselecting the configuration of the crack attenuator particles 4b. In particular, in accordance with the invention, the crack attenuator particles 4b are made to be diskette or platelet in shape.

Figure 2:
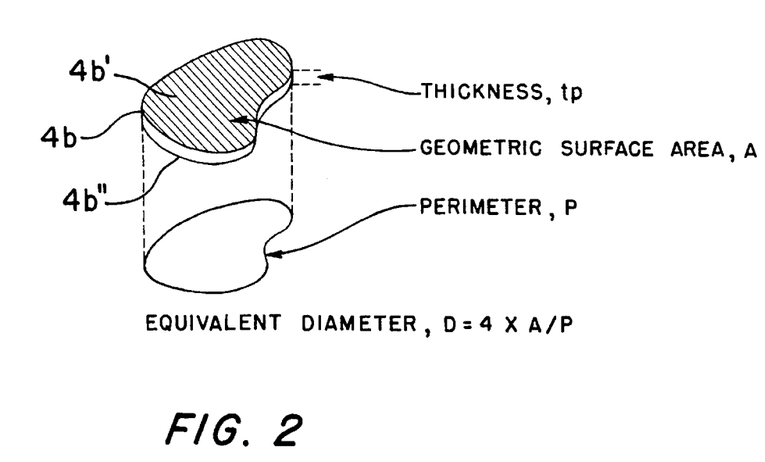
FIG. 2 shows a pictorial illustration of a platelet-shaped crack attenuator particle in accordance with the principles of the present invention.

FIG. 2 shows an enlarged idealized view of one of the platelet crack attenuator particles 4b in which the perimeter of the platelet is irregular and the platelet upper and lower surfaces 4b' and 4b'' are generally parallel and separated by the platelet thickness tp. For the platelet in FIG. 2 where the surfaces 4b' and 4b'' are substantially the same, the equivalent or effective diameter D can be expressed as follows:

$$D = 4 \cdot A/P \quad (1)$$

where A is the geometric surface area and P the perimeter of one of the surfaces 4b' or 4b''. The aspect ration AR of the platelet can, in turn, be expressed as follows:

$$AR = D/tp \quad (2)$$

A preferable range of effective diameters D for the platelet crack attenuator particles 4b of the invention is a range of about 20 to 100 microns. The aspect ratio AR of the particles is preferably in a range of about 4 to 20.

It is also preferable that the platelets 4b be arranged in the matrix 4 so that their thickness dimension tp tends to align with the thickness dimension $t_m$ of the matrix. This places the plane of each of the platelets generally in line with the plane of the matrix. While each of the platelets of FIG. 2 has an irregular contour or perimeter, the platelet contour can also be made regular. In particular, elliptical or circular contours might be used.

The crack attenuator platelets 4b of the invention are preferably formed from materials which are stable in the carbonate electrolyte environment. Preferable materials are ceramic materials such as alumina ($Al_2O_3$), lithiated alumina ($LiAlO_2$) and $Si_3N_4$.

Figure 3:
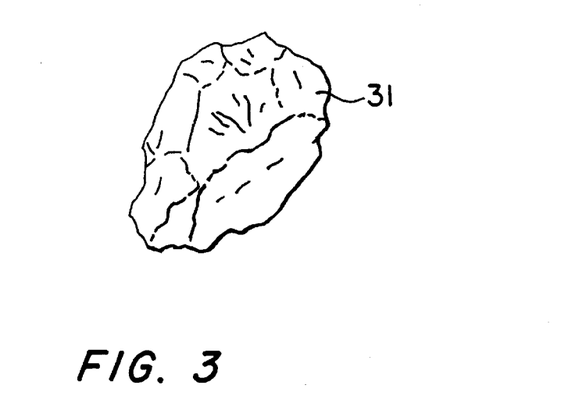
FIG. 3 shows a pictorial illustration of a conventional non-porous boulder-shaped crack attenuator particle.
Figure 4:
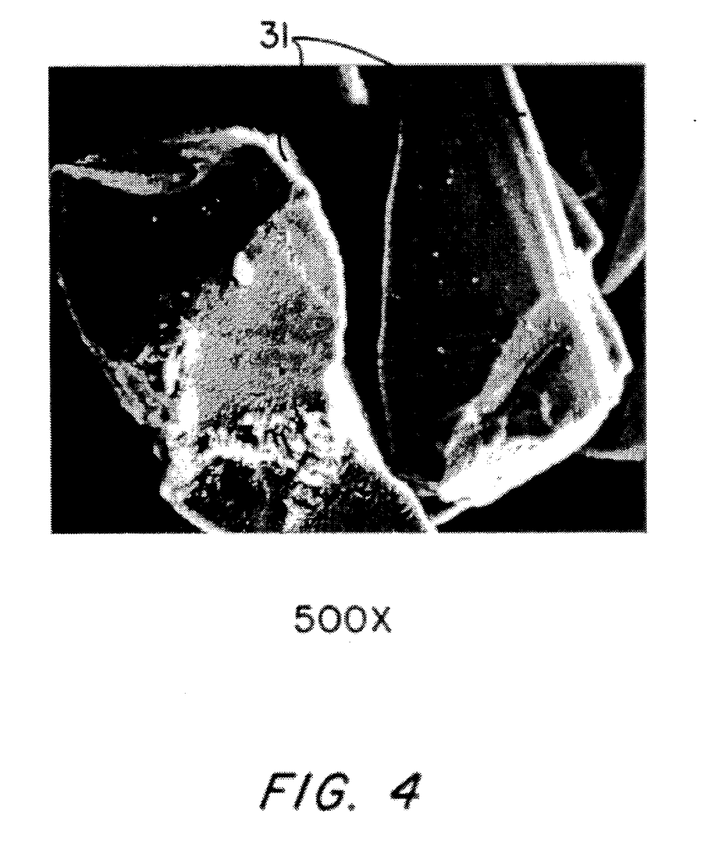
FIG. 4 is an enlargement of a section of a conventional carbonate fuel cell matrix showing its non-porous boulder-shaped crack attenuator particles.

With the crack attenuator particles 4b of the matrix 1 of the invention formed as platelets, the ability of the matrix to withstand through cracking as a result of stresses encountered during operation is increased considerably over matrix constructions in which conventional non-porous boulder-shaped particles are used. FIG. 3 pictorially shows one such boulder-shaped crack attenuator particle 31. FIG. 4 shows a micro-photograph of a section of a conventional matrix using such boulder-shaped particles. Conventional boulder-shaped crack attenuator particles generally have aspect ratios of between 1 and 1.5.

The use of the platelet crack attenuators 4b of the invention is believed to promote better crack bowing as well as deflection. As a result, stresses in the matrix due to thermal changes are better dissipated.

Figure 5:
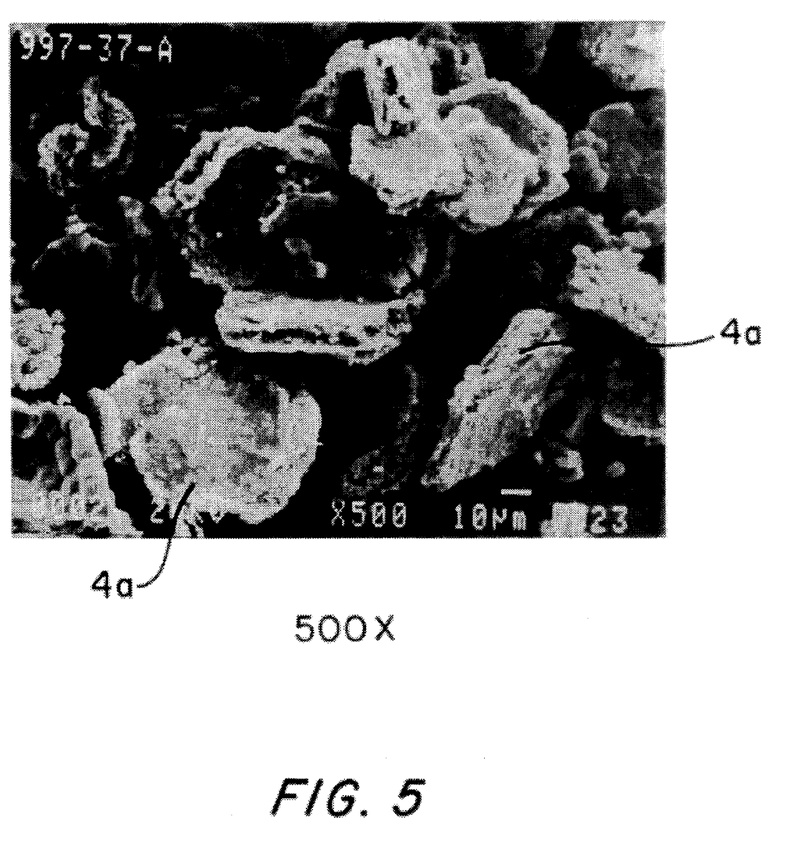
FIG. 5 shows is enlargement of a section of the carbonate fuel cell matrix of the invention showing its platelet-shaped crack attenuator particles.
Figure 6:
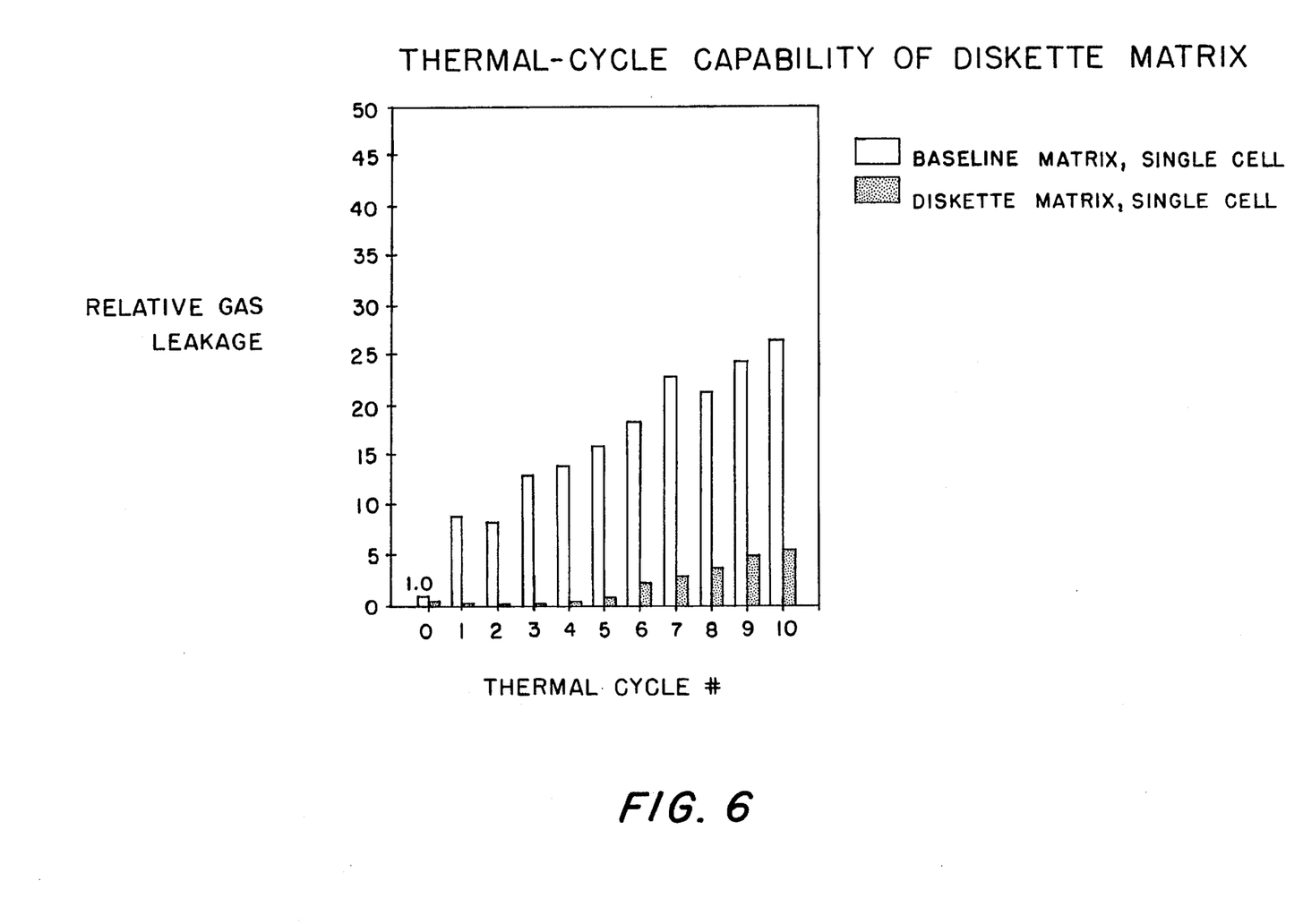
FIG. 6 is a plot of relative gas leakage versus thermal cycle for the carbonate matrix of the invention and a carbonate matrix using boulder-shaped crack attenuator particles.

FIG. 5 is a micro-photograph of a portion of a matrix of the invention fabricated using platelet alumina particles. FIG. 6 is a graph of the relative gas leakage as a function of thermal cycle of the platelet matrix of FIG. 5 and the conventional matrix of FIG. 4 which uses non-porous boulder-shaped crack attenuator particles. As can be seen, the matrix of the invention provided relatively less gas leakage after each thermal cycle and after 10 thermal cycles its relative gas leakage was more than five times less than that of the conventional matrix.

In a further aspect of the invention, the platelet crack attenuator particles 4b of the invention can be further adapted to have a significantly different thermal coefficient of expansion than the submicron support particles 4a. This can be achieved by selecting, as the material used to form the crack attenuator particles, a material having a thermal coefficient of expansion which is higher or lower than that of the material of the submicron particles. Preferably, the thermal coefficient of expansion of the material of the crack attenuator particles should be higher or lower than that of the material of the support particles by a factor of two or more.

A specific material for the crack attenuator particles which can provide the desired significant difference (i.e., a factor of two or more difference) in thermal coefficient of expansion is $Si_3N_4$. The thermal coefficient of $Si_3N_4$ significantly differs from that of $\gamma$-$LiAlO_2$, the preferred material for the submicron particles 4a, particularly at temperatures where thermal stresses in the matrix are a maximum (i.e., at temperatures lower than about 490° C.). Specifically, the thermal coefficient of expansion of the $Si_3N_4$ is about one-half of that of $\gamma$-$LiAlO_2$.

The use of crack attenuator particles 4b whose thermal coefficient of expansion significantly differs from that of the support particles 4a creates spaces between the particles during expansion and contraction. These spaces, in turn, promote the occurrence of micro-cracks in the matrix which make the matrix more pliable and thus more able to absorb thermally induced stresses.

In a matrix using submicron and crack attenuator particles, the latter particles allow the submicron particles to be densely packed. This results in a low porosity for the matrix and a high tortuosity factor, causing the matrix ionic resistance to increase.

Figure 7:
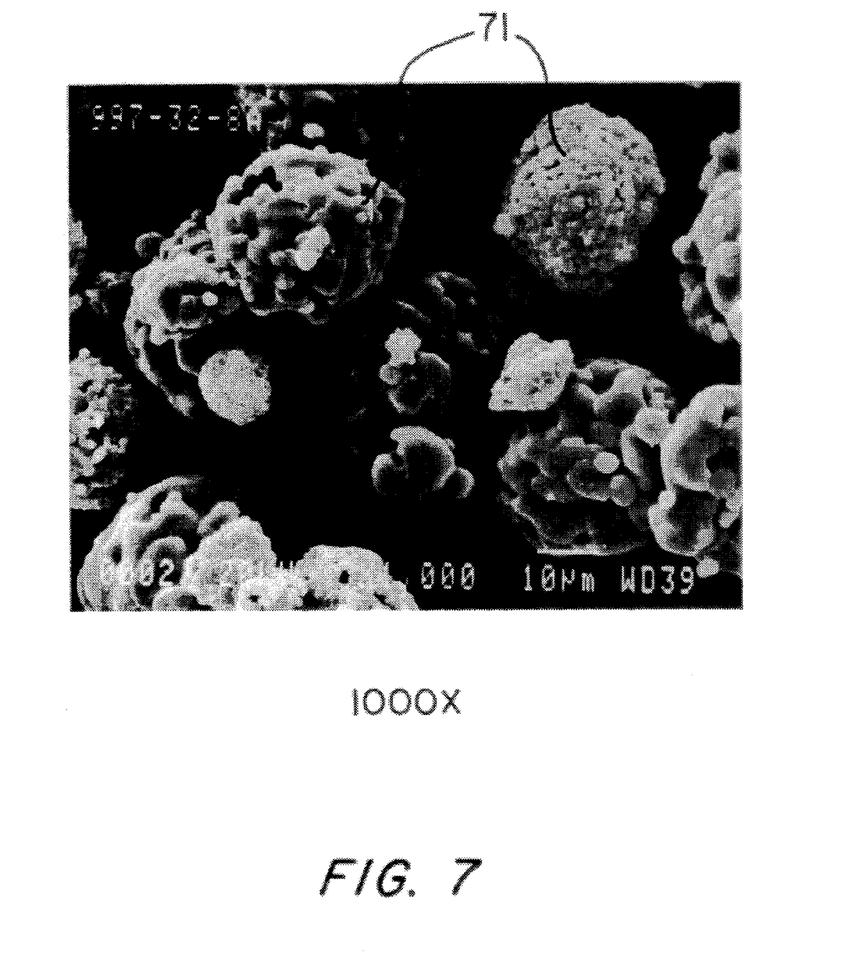
FIG. 7 shows an enlargement of a section of a further embodiment of a carbonate fuel cell matrix in accordance with the principles of the present invention and in which porous boulder-shaped crack attenuator particles are used.

In accordance with a further aspect of the invention, the ionic resistance of a carbonate matrix is decreased by forming at least part of the crack attenuator particles of the matrix to be porous. A matrix which utilizes boulder-shaped crack attenuator particles some of which are porous will thus exhibit decreased ionic resistance. FIG. 7 shows a microphotograph of a section of a matrix in accordance with the invention in which porous boulder-shaped lithiated alumina particles 71 are used.

While the matrix of FIG. 7 utilizes only boulder-shaped crack attenuator particles, a matrix can be constructed which utilizes a combination of the platelet-shaped and porous boulder-shaped crack attenuator particles of the invention. The platelet-shaped crack attenuator particles of such a matrix can also be porous and a matrix can also be made which utilizes only porous platelet-shaped crack attenuator particles. Such matrices will have the benefits of increased crack resistance due to the platelets and reduced ionic resistance due to the porosity of the porous crack attenuator particles used.

The matrix of the invention can be fabricated by utilizing powders comprising the submicron support particles and the larger crack attenuator particles and then applying tape casting processing techniques to the powders. To this end, the processing and tape casting techniques described in the aforementioned '776 patent can be utilized.

A particular matrix of the invention might be fabricated to include 65 wt % $LiAlO_2$ powder for the submicron support particles and 35 wt % $Al_2O_3$ powder for the crack attenuator particles. Another matrix might be fabricated from 74 wt % $LiAlO_2$ powder for the submicron particles and 26 wt % $LiAlO_2$ powder for the crack attenuator particles. In the latter examples, the crack attenuator particles can be either the platelet-shaped or porous boulder-shaped particles of the invention. A third matrix might be constructed from 69 wt % $LiAlO_2$ powder for the submicron particles, 12.2 wt % porous $LiAlO_2$ powder containing spherical boulder particles and 18.6 wt % $Al_2O_3$ powder containing platelet-shaped particles for the crack attenuator particles.

Figure 8:
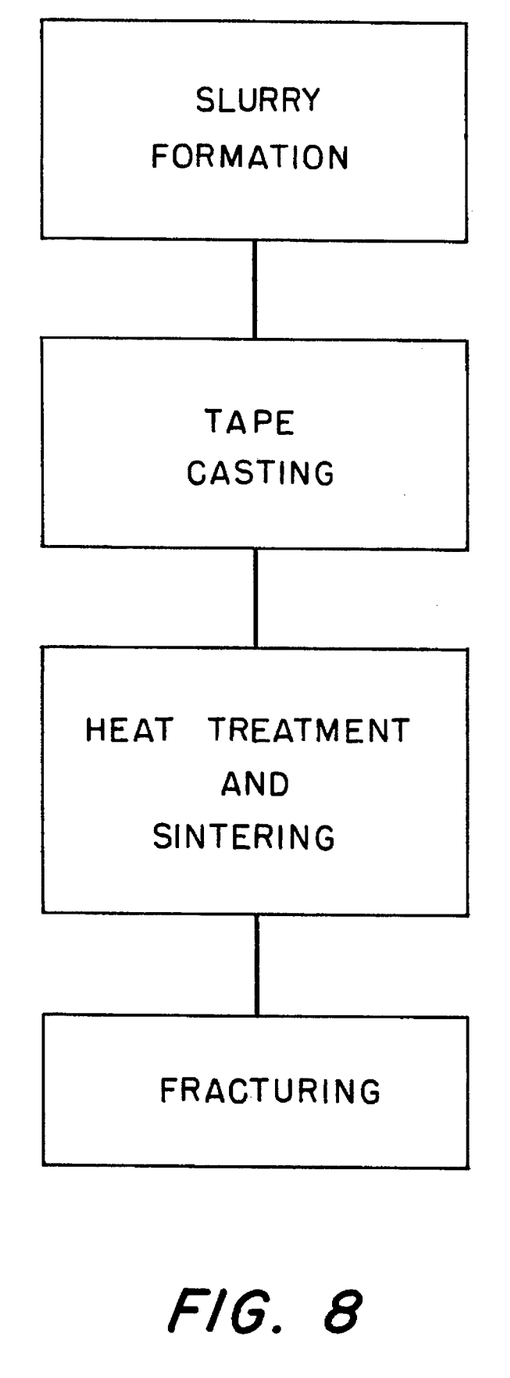
FIG. 8 shows a flow diagram of a process for making platelet-shaped crack attenuator particles in accordance with the invention.

The platelet shaped crack attenuator particles 4b of the invention can be made by processing sub-micron sized particles of the materials discussed above as being suitable for forming the platelet-shaped crack attenuator particles, i.e., materials stable in the carbonate electrolyte such as the ceramic materials $Al_2O_3$, $LiAlO_2$ and $Si_3N_4$. A suitable processing procedure is shown in FIG. 8.

More particularly, a precursor ceramic material having sub-micron particles is mixed with an organic binder, solvent and auxiliary organic materials (plasticizer and deflocculant) to form a slurry. The solvent in the slurry is then removed by drying in air or a vacuum, and the slurry is then tape cast into a thin sheet. The thickness of the sheet might typically be equal to or less than 100 µm.

The thin cast sheet containing the sub-micron ceramic particles and organics (binder and auxiliary) is then heat treated to remove the organics and to sinter the sheet. The heat-treating conditions (temperature schedule and gas atmosphere) are determined to achieve complete organic removal and a desired final porosity for the resultant platelets. The porosity required is dictated by the low resistance desired for the matrix to be formed by the platelets, as above-described. A typical range of desired porosities might be 20–45%.

During the heat treating, sufficient thermal stress is generated so that the resultant sheet can be fractured to form platelets of micron size. This fracturing may be made to occur at desired locations by applying a pattern to the tape cast sheet prior to sintering. Application of a pattern to the sheet can be realized by pressing the tape with a screen having a desired mesh size and shape. The pattern may also be produced by casting the slurry directly on the screen. In both cases, the pattern produces weak areas in the sheet that can preferentially permit separation during the fracturing process which can be carried out by hand or by using any other suitable agitating procedure.

Once heat treating and fracturing are completed, the resultant micron sized, porous, platelet-shaped particles can be further milled if size reduction is required. The resultant particles can then be processed as above-described to form the matrix of the invention.

As an example of the above process, porous platelet-shaped $LiAlO_2$ particles were made starting with submicron $LiAlO_2$ powder formed into a slurry with an acrylic binder, a ketone solvent, a fish oil deflocculant and a plasticizer. The slurry was then dried in air to remove the solvent, and the solvent free slurry tape cast to a thickness of 70µ. A screen of mesh size No. 50 was then pressed into the resultant tape cast sheet to produce a pattern of stress areas for permitting preferential fracture.

The tape cast sheet was then heat treated and sintered at a temperature of 1300° to 1400° C. for 0.5 to 1.5 hours in an oxidizing atmosphere (air) and fractured. The temperature was held at 900° C. for more than one hour to ensure the retention of $\gamma$ phase $LiAlO_2$ after sintering. The sintered sheet was then hand fractured along the pattern of stress areas to produce the desired micron sized, porous, thin platelet-shaped particles.

Porous boulder-shaped ceramic particles usable with the invention can be made by spray drying a mixture of lithium aluminate powder and organics (binder, solvent, etc.) followed by binder burnout and calcination at high temperatures (e.g., 500° C. for binder burnout and 900° C. for calcination).

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, the use of crack attenuator particles having a thermal coefficient of expansion which is significantly greater than that of the support particles can be used in a matrix in which the crack attenuator particles are boulder-shaped as opposed to being platelet-shaped as discussed above. In such case, the boulder-shaped crack attenuator particles can comprise $Si_3N_4$ and the submicron particles $\gamma$-$LiAlO_2$.

What we claim is:

1. A matrix for use in carrying carbonate electrolyte in a carbonate fuel cell comprising:
   a support material containing support particles of a first size; and
   crack attenuator particles of a second size larger than said first size distributed in said support material, said crack attenuator particles having a platelet shape.

2. A matrix in accordance with claim 1 wherein:
   said crack attenuator particles are arranged in said matrix such that the thickness of said crack attenuator particles is generally aligned with the thickness of said matrix.

3. A matrix in accordance with claim 1 wherein:
   said support particles are submicron in size; and
   said crack attenuator particles have a mean diameter in a range of about 20 to 100 microns.

4. A matrix in accordance with claim 3 wherein:
   said crack attenuator particles comprise a first ceramic material.

5. A matrix in accordance with claim 4 wherein:
   said first ceramic material is one of $Al_2O_3$, lithiated $Al_2O_3$ and $Si_3N_4$.

6. A matrix in accordance with claim 5 wherein:
   said support particles comprise a second ceramic material.

7. A matrix in accordance with claim 6 wherein:
   said second ceramic material is $\gamma$-$LiAlO_2$.

8. A matrix in accordance with claim 3 wherein:
   said crack attenuator particles have an aspect ratio in the range of about 4 to 20.

9. A matrix in accordance with claim 1 further comprising:
   further crack attenuator particles carried in said support material, said further crack attenuator particles having a mean diameter substantially equivalent to the mean diameter of said crack attenuator particles and being porous.

10. A matrix in accordance with claim 9 wherein:
    said further crack attenuator particles have a boulder-shape.

11. A matrix in accordance with claim 10 wherein:
    said further crack attenuator particles comprise lithiated alumina.

12. A matrix in accordance with claim 9 wherein:
    at least a portion of said crack attenuator particles and/or further crack attenuator particles have a thermal coefficient of expansion which is significantly different than the thermal coefficient of expansion of said support particles.

13. A matrix in accordance with claim 12 wherein:
    said portion of crack attenuator particles comprise $Si_3N_4$.

14. A matrix in accordance with claim 13 wherein:
    said support particles comprise $\gamma$-$LiAlO_2$.

15. A matrix in accordance with claim 12 wherein:
    the thermal coefficient of said portion of said crack attenuator particles differs from the thermal coefficient of said support particles by at least about a factor of two.

16. A matrix in accordance with claim 1 wherein:
    said crack attenuator particles have an aspect ratio in a range of about 4 to 20.

17. A matrix in accordance with claim 1 wherein:
    at least a portion of said crack attenuator particles have a different thermal coefficient of expansion than the thermal coefficient of expansion of said support particles.

18. A matrix in accordance with claim 17 wherein:
    the difference between the thermal coefficient of expansion of said portion of said crack attenuator particles and the thermal coefficient of expansion of said support particles is significant.

19. A matrix in accordance with claim 18 wherein:
    said portion of crack attenuator particles comprise $Si3_3N_4$.

20. A matrix in accordance with claim 19 wherein:
    said support particles comprise $\gamma$-$LiAlO_3$.

21. A matrix in accordance with claim 18 wherein:
    said support particles are submicron in size;
    and said crack attenuator particles have a mean diameter in a range of about 20 to 100 microns.

22. A matrix in accordance with claim 18 wherein:
    the thermal coefficient of said portion of said crack attenuator particles differs from the thermal coefficient of said support particles by at least about a factor of two.

23. A matrix in accordance with claim 1 wherein:
    at least some of said crack attenuator particles are porous.

24. A matrix for use in carrying carbonate electrolyte in a carbonate fuel cell comprising:
    support material containing support particles of a first size;
    and crack attenuator particles of a second size larger than said first size, and having a platelet shape, distributed in said support material and at least a portion of which crack attenuator particles are porous.

25. A matrix in accordance with claim 24 wherein:
    said crack attenuator particles comprise lithiated alumina.

26. A matrix in accordance with claim 24 wherein:
    said support particles are submicron in size; and
    said crack attenuator particles have a mean diameter in a range of about 20 to 100 microns.

27. A matrix in accordance with claim 23 wherein:
    at least a portion of said crack attenuator particles have a thermal coefficient of expansion which is significantly different than the thermal coefficient of expansion of said support particles.

28. A matrix in accordance with claim 27 wherein:
    said portion of said crack attenuator particles comprise $Si_3N_4$.

29. A matrix in accordance with claim 28 wherein:
    said support particles comprise $\gamma$-$LiAlO_3$.

30. A matrix in accordance with claim 27 wherein:
    the thermal coefficient of said portion of said crack attenuator particles differs from the thermal coefficient of said support particles by at least about a factor of two.

31. A matrix for use in carrying carbonate electrolyte in a carbonate fuel cell comprising:

a support material containing support particles of a first size;

crack attenuator particles of a second size larger than said first size, having a platelet shape, distributed in said support material and at least a portion of which have a thermal coefficient of expansion which is significantly different than the thermal coefficient of expansion of said support particles.

32. A matrix in accordance with claim 31 wherein:

said portion of said crack attenuator particles comprise $Si_3N_4$.

33. A matrix in accordance with claim 32 wherein:

said support particles comprise $\gamma$-$LiAlO_3$.

34. A matrix in accordance with claim 33 wherein:

said support particles are submicron in size;

and said crack attenuator particles have a mean diameter in a range of about 20 to 100 microns.

35. A matrix in accordance with claim 31 wherein:

the thermal coefficient of said portion of said crack attenuator particles differs from the thermal coefficient of said support particles by at least about a factor of two.

36. A method of making platelet-shaped particles comprising the steps of:

forming a slurry containing sub-micron sized particles of a ceramic material;

tape casting said slurry to form a sheet;

heating said tape cast sheet to sinter said sheet; and fracturing said sheet to form micron sized platelet-shaped particles.

37. A method in accordance with claim 36 wherein:

said ceramic is one of $LiAlO_2$, $Al_2O_3$ and $Si_3N_4$.

38. A method in accordance with claim 37 further comprising:

prior to said fracturing, creating a pattern of preferential stress areas in said sheet.

39. A method in accordance with claim 38 wherein:

said fracturing occurs along said pattern.

40. A method in accordance with claim 39 wherein:

said step of creating includes one of pressing a screen into said tape cast sheet or tape casting said sheet onto a screen.

41. A method in accordance with claim 36, wherein:

said heating is conducted in accordance with a preselected heating schedule and in a preselected atmosphere, to achieve organic removal and porosity.

42. A method in accordance with claim 36 wherein:

said ceramic is $LiAlO_2$;

and said heating is at a temperature in the range of to 1400° C. and is conducted over a period of time in a range 1300° of 0.5 to 1.5 hours.

43. A method in accordance with claim 42 wherein:

said heating is conducted in an oxidant atmosphere.

44. A method in accordance with claim 43 wherein:

said oxidant is air.

45. A method in accordance with claim 36 wherein:

said heating is conducted under conditions such that said sintered sheet is porous.

* * * * *

UNITED STATES PATENT AND TRADEMARK OFFICE
CERTIFICATE OF CORRECTION

PATENT NO. : 5,580,673

DATED : December 3, 1996

INVENTOR(S): Mohammad Farooque, et al.

It is certified that error appears in the above-identified patent and that said Letters Patent is hereby corrected as shown below:

Col. 8, line 20, change "$Si3_3N_4$" to -- $Si_3N_4$ --.

Col. 10, line 20, after "range of" insert -- 1300 --.

Col. 10, line 22, delete "1300°".

Signed and Sealed this

Seventeenth Day of June, 1997

*Attest:*

BRUCE LEHMAN

*Attesting Officer*      *Commissioner of Patents and Trademarks*